(12) United States Patent
Kishi (10) Patent No.: US 8,301,898 B2
(45) Date of Patent: Oct. 30, 2012

(54) IMAGE PROCESSING SYSTEM

(75) Inventor: Nobuya Kishi, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 985 days.

(21) Appl. No.: 12/049,165

(22) Filed: Mar. 14, 2008

(65) Prior Publication Data

US 2008/0231890 A1 Sep. 25, 2008

(30) Foreign Application Priority Data

Mar. 14, 2007 (JP) .................................. 2007-064956

(51) Int. Cl.
G06F 21/00 (2006.01)

(52) U.S. Cl. ........ 713/182; 715/740; 715/741; 715/736; 455/556.1

(58) Field of Classification Search .................. 713/182, 713/18; 715/740, 741, 736
See application file for complete search history.

(56) References Cited

U.S. PATENT DOCUMENTS

| | | | |
|---|---|---|---|
| 6,628,961 B1 * | 9/2003 | Ho et al. ..................... | 455/554.1 |
| 7,051,281 B1 * | 5/2006 | Yokota .......................... | 715/740 |
| 7,455,229 B2 * | 11/2008 | Tanaka ..................... | 235/462.01 |
| 7,603,189 B2 * | 10/2009 | Tanaka et al. ................... | 700/83 |
| 2004/0133636 A1 | 7/2004 | Kinoshita et al. | |
| 2005/0279833 A1 | 12/2005 | Tanaka | |
| 2007/0019215 A1 * | 1/2007 | Yu .................................... | 358/1.3 |
| 2008/0248828 A1 | 10/2008 | Tomiyasu | |

FOREIGN PATENT DOCUMENTS

| | | |
|---|---|---|
| CN | 1512426 A | 7/2004 |
| CN | 1713685 A | 12/2005 |
| CN | 1893529 A | 1/2007 |
| JP | 2004-139158 A | 5/2004 |
| JP | 2006-67339 A | 3/2006 |
| JP | 2007-36404 A | 2/2007 |
| JP | 2007-043647 A | 2/2007 |
| JP | 2008-252897 A | 10/2008 |
| WO | 2006/030838 A1 | 3/2006 |

OTHER PUBLICATIONS cursor. (2005). In The Crystal Reference Encyclopedia. Retrieved from http://www.credoreference.com/entry/cre/touch_screen.*
touch screen. In Microsoft Computer Dictionary. Microsoft Press 2002.*

* cited by examiner

Primary Examiner — Kambiz Zand
Assistant Examiner — Imhotep Durham
(74) Attorney, Agent, or Firm — Birch, Stewart, Kolasch & Birch, LLP (57) ABSTRACT

The object is to enable a user to efficiently set a function for an image processing apparatus using a display medium he carries. When a user operates his mobile phone to activate a function setting information input program, an input screen for setting a function is displayed. When the user inputs function setting information, the mobile phone performs a code conversion for the function setting information to create a code image, and displays it on a display section. The user holds up the code image displayed on the mobile phone to a reading section of an image processing apparatus. The reading section reads the code image. The image processing apparatus performs authentication of the user, and then, it extracts the function setting information from the code image and sets a function. The image processing apparatus performs image processing in accordance with the function.

9 Claims, 8 Drawing Sheets

IMAGE PROCESSING SYSTEM

BACKGROUND OF THE INVENTION

1. Field of the Invention

The present invention relates to an image processing system for setting a function for an image processing apparatus which performs image processing such as copying, printing, scanning, facsimile communication and document filing.

2. Description of the Related Art

An image processing apparatus such as a digital composite machine is an office machine which performs multiple image processings such as copying, printing, facsimile communication, scanning and document filing. When executing a function satisfying his needs, a user makes various function settings with the use of the operation panel of the image processing apparatus or a web page.

Japanese Patent Laid-Open No. 2004-139158 discloses an image processing system for setting a function for an image processing apparatus with the use of a mobile medium apparatus such as a mobile phone. According to this system, printing conditions are inputted with a mobile phone, and information about the printing conditions are transmitted from the mobile phone to a management server. The management server generates a barcode for the information about the printing conditions and transmits it to the mobile phone. The mobile phone displays the received barcode on the screen. The image processing apparatus reads the barcode displayed on the mobile phone, and sets the printing conditions.

When using an apparatus having various functions such as a digital composite machine, a user provides input for setting a function with the use of the operation panel. However, it often takes much time to provide the input. Since the user occupies the image processing apparatus during the time, other users cannot use the image processing apparatus, and the use efficiency is lowered.

In the case of setting a function with the use of a Web page, an environment is required in which the image processing apparatus and a personal computer are connected via a network to operate the Web page. Therefore, the image processing apparatus cannot be installed everywhere, which is not convenient.

Though a function can be conveniently set by using a code image displayed on a mobile phone as described above, it is necessary to communicate a management server and acquire the code image in advance. Therefore, an extra communication cost occurs. If the user is out of the mobile phone service range, communication itself is impossible, and the code image cannot be acquired. Furthermore, when it is desired to continuously use the image processing apparatus to set a different function, communication must be established with the management server each time, and it is inefficient to spend this time.

In view of the above problems, the object of the present invention is to provide an image processing system enabling a user to efficiently set a function.

SUMMARY OF THE INVENTION

The present invention is an image processing system for setting a function for an image processing apparatus which performs image processing on the basis of the set function, with the use of a portable display medium for displaying an image, wherein the image processing apparatus is provided with a reading section for reading an image displayed on the display medium, the display medium creates and displays a setting image indicative of function setting information, and the image processing apparatus sets a function on the basis of the function setting information at the time the reading section reads the setting image.

By carrying a display medium, a user can create a setting image on the display medium no matter where he is. Therefore, he can prepare for setting of a function as necessary, and he can immediately perform image processing son the basis of a desired function, on the image processing apparatus.

The setting image includes authentication information about a user, and the image processing apparatus performs authentication of the user on the basis of the setting image. The setting image includes instruction information for starting execution of image processing, and, the image processing apparatus automatically starts setting of a function at the time the setting image is read. Accordingly, the necessity of inputting the authentication information is eliminated, and an operation for starting image processing becomes unnecessary. Thereby, the user can save the trouble, and the use time of the image processing apparatus is shortened.

Here, the setting image is a code image, and the display medium is a mobile medium apparatus such as a mobile phone having a screen. Since such a mobile medium apparatus is always carried by the user, it can be used at once. Therefore, the convenience for performing image processing can be improved.

The display medium is provided with an image creation section for creating the setting image on the basis of the function setting information. By the image creation section creating a setting image such as a code image on the screen, the setting screen is displayed. By this image creation section being provided, the seating image can be formed only by the display medium independently, and thereby, the convenience for the user is enhanced.

The display medium is provided with an information input section for inputting the function setting information. The user inputs the function setting information through the information input section. Here, the information input section displays a screen similar to the operation screen of the image processing apparatus. Thereby, the user can provide input, without uncomfortable feeling, as if he were operating the image processing apparatus.

The information input section communicates with an external apparatus and inputs the function setting information from the external apparatus. For example, like a personal computer, the external apparatus is such that input can be performed more easily than the case of using a display medium such as a mobile medium. By using the external apparatus, the user can easily input the function meeting information. Here, the information input section has a function of communicating with the external apparatus. When the external apparatus transmits the function setting information to the display medium, the information input section receives the function setting information, and thereby, the function setting information is inputted to the display medium.

The display medium stores multiple pieces of function setting information and displays a setting image corresponding to called function setting information. In the case of setting the same function as before, stored function setting information can be called-up without the necessity of providing input again, and the function can be efficiently set. In the case of editing function setting information also, the function setting information can be called-up, and editing can be efficiently performed only by changing a part of the function setting information.

The display medium is a recording sheet on which the setting image is printed. That is, by an image being printed on a recording sheet, the recording sheet becomes a portable display medium for displaying an image. A setting image is printed and formed on a recording sheet, and the reading section of the image processing apparatus reads the setting image on the recording sheet. By using the recording sheet, the time for an operation for displaying a setting image on the screen of a mobile medium apparatus becomes unnecessary.

According to the present invention, by forming a setting image on a display medium on the basis of inputted function setting information, it is possible to prepare for setting of a function irrespective of the place of use. For the user, since it is possible to form a setting image for setting a function any time, he can efficiently set a function. For the image processing apparatus, since the time occupied by the user is reduced, the user turnover rate rises, and the use efficiency is improved.

BRIEF DESCRIPTION OF THE DRAWINGS

FIG. 2a and FIG. 2b are diagrams for illustrating communication between the image processing apparatus and a mobile phone, wherein FIG. 2a shows infrared communication and FIG. 2b shows USB communication;

DETAILED DESCRIPTION OF THE INVENTION

Figure 1:
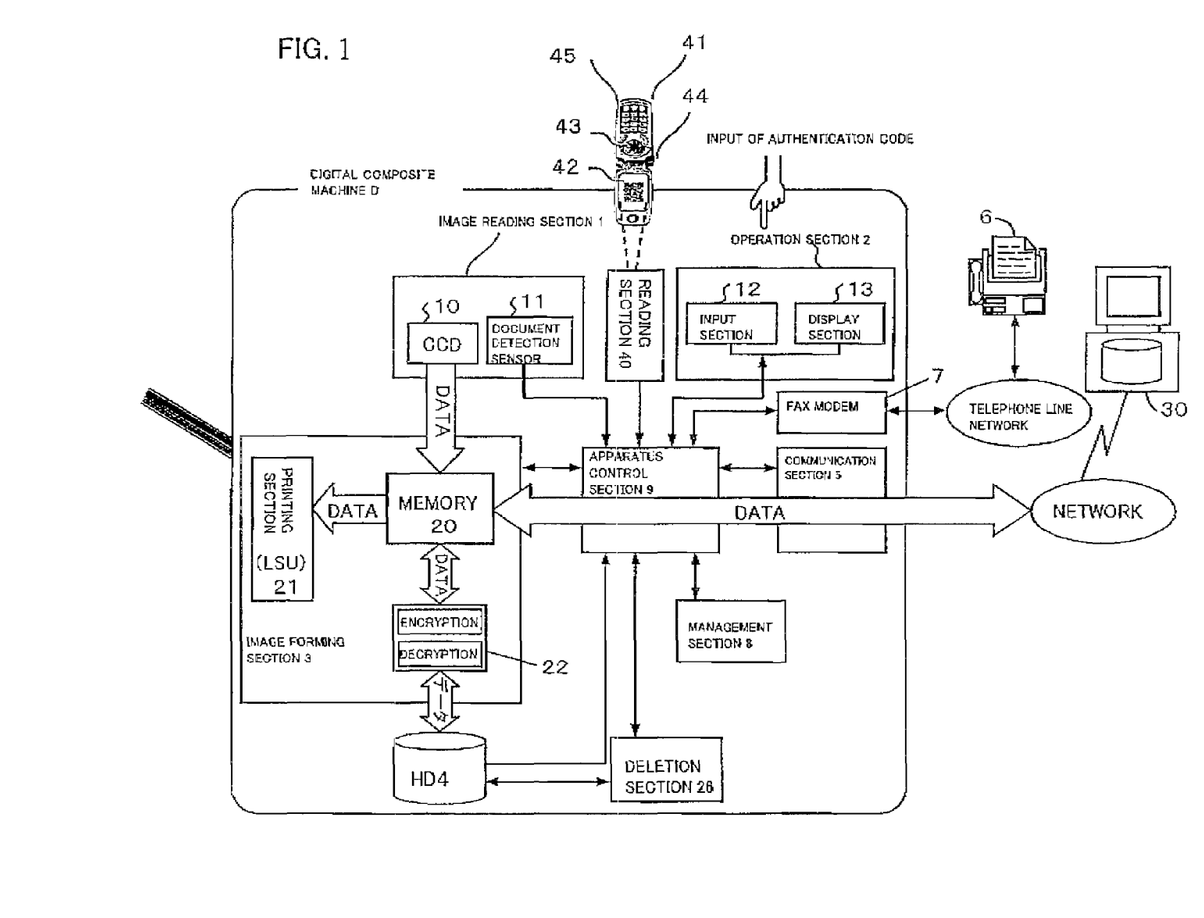
FIG. 1 is a diagram showing the whole schematic configuration of the image processing system of the present invention.

FIG. 1 shows the image processing apparatus of this embodiment. This image processing apparatus in a digital composite machine D having the modes of copying, printing, scanning, facsimile communication and document filing, and it in provided with an image reading section 1 for reading a document and inputting image data, an operation section 2 for accepting input by a user, an image forming section 3 for printing the inputted image data, a hard disk device 4 for storing the image data, a communication section 5 for performing data communication with an external apparatus, a FAX modem 7 for communicating with a facsimile apparatus 6, a management section 8 storing control information of the whole apparatus, setting information and the like, and an apparatus control section 9 constituted of a CPU for controlling the whole apparatus.

The image reading section 1 has an image capture device such as a CCD 10, and a document detection sensor 11 for detecting a document set on a document table or an automatic document feeder (ADF). The image data of a document read by the CCD 10 is outputted to the image forming section 3.

The operation section 2 is provided with an operation panel having an input section 12 configured by various input keys and a display section 13 such as a liquid crystal display. The display section 13 is a touch panel, and it also functions as an input section. Operation instructions for the whole apparatus and various settings are inputted on the operation section 2, and the inputted contents and the operation state of the whole apparatus are displayed.

The image forming section 3 has a memory 20 for storing inputted image data and a printing section 21 provided with a laser scanning unit, and an encryption/decryption section 22.

A readable/writable semiconductor memory, such as an SDRAM and a flash memory, is used as the memory 20. The memory 20 is divided into an area for storing inputted image data and an area for storing image data to be outputted. It is also possible to use two memories 20 for input and output, respectively, instead of using one memory 20 divided into two a parts.

Inputted image data is stored in the memory 20 of the image forming section 3. The image data is stored in the memory 20 by overwriting old image data with the new image data. Image processing such as compression, expansion and processing is performed for the image data, and the image data is stored in the memory 20. The image-processed image data is outputted to the printing section 21, the hard disk device 4 or the apparatus control section 9. The printing section 21 prints an image on a recording sheet on the basis of the image data stored in the memory 20.

The communication section 5 is connected to a router, a switching hub or the like via a LAN cable and connected to a network formed by information processing apparatuses 30 such as a personal computer and a server. The network is connected to the Internet via a communication line such as a telephone line network and an optical fiber. The communication section 5 transmits and receives data to and from an information processing apparatus 30 within the network, and transmits and receives data and e-mails to and from an external information processing apparatus 30. Furthermore, it performs Internet facsimile communication with a facsimile apparatus via the Internet. The FAX modem 7 is connected to the telephone line network via a telephone line and performs facsimile communication with an external facsimile apparatus 6. The communication section 5 and the FAX modems 7 receive input of image data from an external apparatus such as an information processing apparatus 30 and a facsimile apparatus 6.

The apparatus control section 9 executes a job for inputted image data. That is, in response to input from the operation section 2 or data input from an external apparatus, the apparatus control section 9 controls each section on the basis of the information stored in the management section 8 to perform image processing of the inputted image data in accordance with a set function. By the job being executed, any of copying, printing, scanning, facsimile communication and document filing is executed, depending on the inputted image data, and an image is outputted in a desired form.

The hard disk device 4 temporarily stores image data. The encryption/decryption section 22 performs encryption processing or decryption processing of image data. When image data is stored in the hard disk device 4, the image data is encrypted by the encryption/decryption section 22. When the encrypted image data is read from the hard disk device 4, the image data is decrypted.

The hard disk device 4 also stores management information as data other than image data. The management information includes filing management information, transmission destination management information, history management information and authentication information. The filing management information is information about files in which inputted image data is stored. The transmission destination management information is information about transmission destinations used for facsimile communication. The history management information is information about the contents of executed processing. The authentication information is identification information such as IDs and the passwords of users.

There is provided a deletion section 26 for deleting image data in the hard disk device 4. The image data to be deleted is data stored in a processing work area. After image data is processed and outputted, the apparatus control section 9 controls the operation of the deletion section 26. The deletion section 26 causes stored data to be unreadable so that the original image cannot be reproduced, by overwriting the data with random data or meaningless data or deleting the data.

The image processing apparatus performs image processing in accordance with a set function. Usually, a function is set by a user operating the operation section 2. In this image processing apparatus, a function is set with the use of a portable display medium for displaying an image. This display medium prepares and displays a setting image indicative of function setting information. The image processing apparatus is provided with a reading section 40 for reading the image on the display medium. The apparatus control section 9 reads the function setting information from the setting image and sets a function at the time the reading section 40 reads the setting image on the display medium. In this way, an image processing system for setting a function for the image processing apparatus, using a display medium is configured.

A mobile phone 41 is used as the display medium. The mobile phone 41 is provided with a display section 42 for displaying a screen, an operation section 43 having various operation buttons, and a control section (not shown) for controlling the display section 42 in response to input from the operation section 43. The display section 42 and the operation section 43 function as an information input section for inputting the function setting information.

The setting image is a code image such as a barcode and a two-dimensional code. The mobile phone 41 incorporates a function setting information input program. The control section creates a code image on the basis of inputted function setting information, and the display section 42 forms and displays the code image on the screen.

The control section controls the display section 42 to display an input screen for setting a function. It also stores the function setting information inputted through the input screen into a storage section (not shown) and converts the function setting information into a code to create a code image. Then, it controls the display section 42 to display the code image. Thus, the control section functions as an image creation section for creating the code image on the display section 42.

Figure 2:
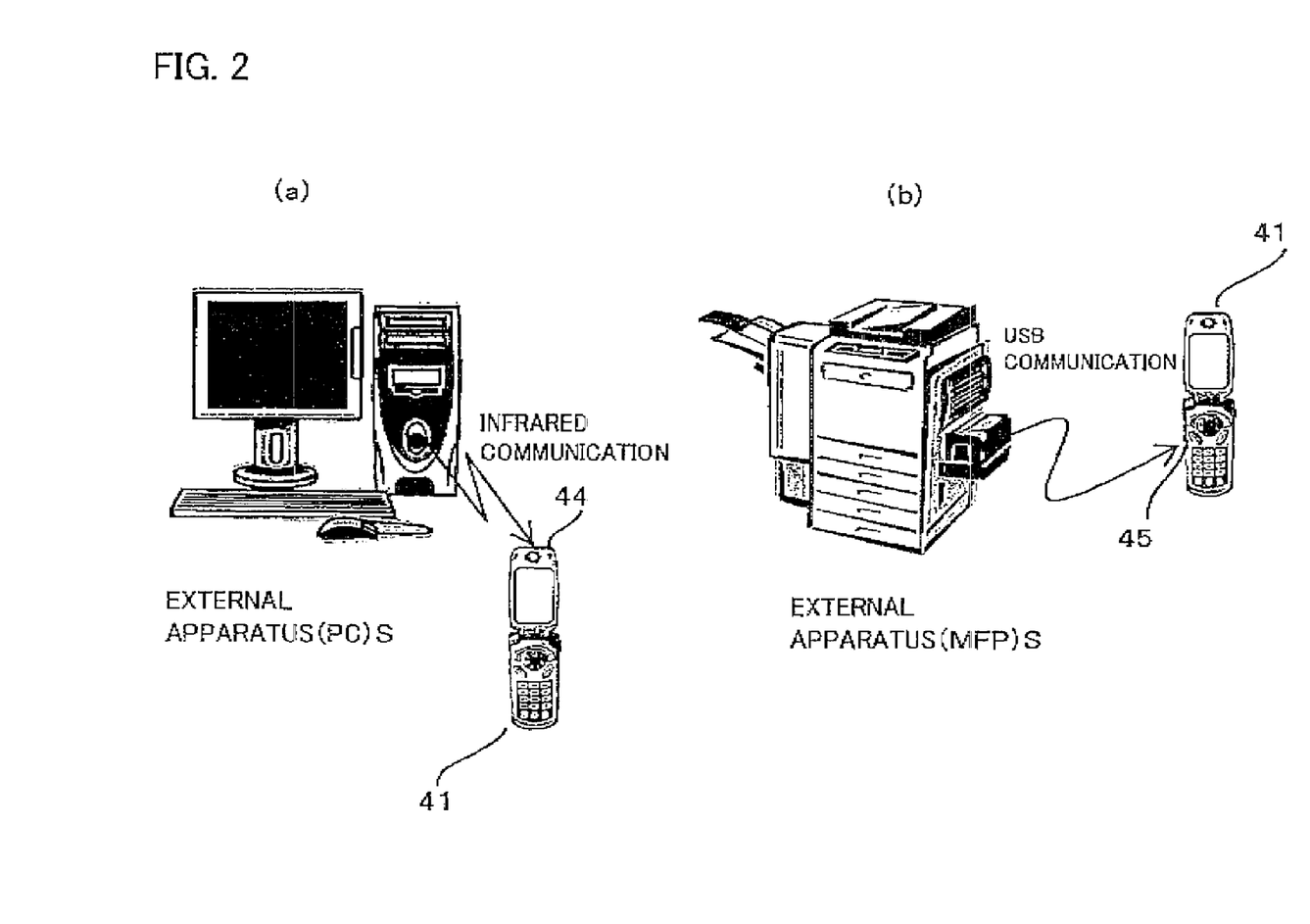

As shown in FIG. 2, the mobile phone 41 is provided with communication sections 44 and 45 for communicating with an external apparatus S such as an information processing apparatus like a personal computer and an image processing apparatus (MFP). The wireless communication section 44 performs wireless communication such as infrared communication, Bluetooth (registered trademark) communication and Wireless LAN communication. The wired communication section 45 performs wired communication using USB.

A CCD camera is used as the reading section 40 of the image processing apparatus and is provided on the operation panel. The reading section 40 reads a code image. The apparatus control section 9 decodes the read code image and acquires function setting information. Then, it performs image processing in accordance with the acquired function.

Figure 3:
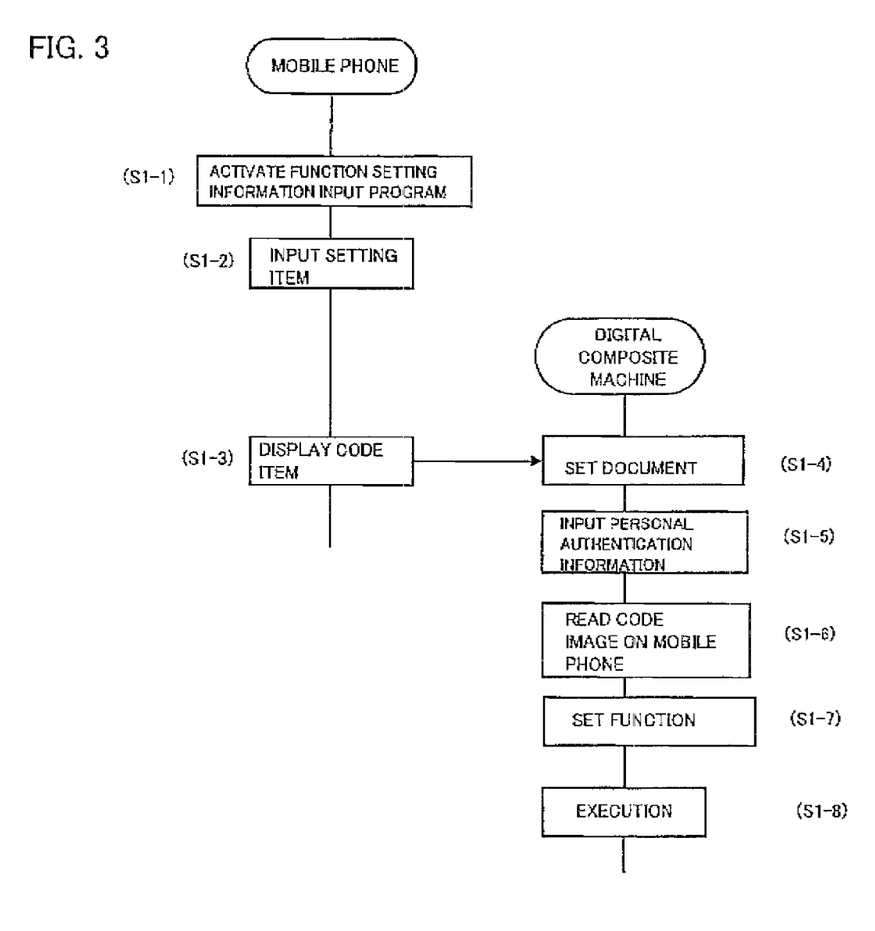
FIG. 3 is a flowchart for setting a function with the use of the mobile phone.
Figure 4:
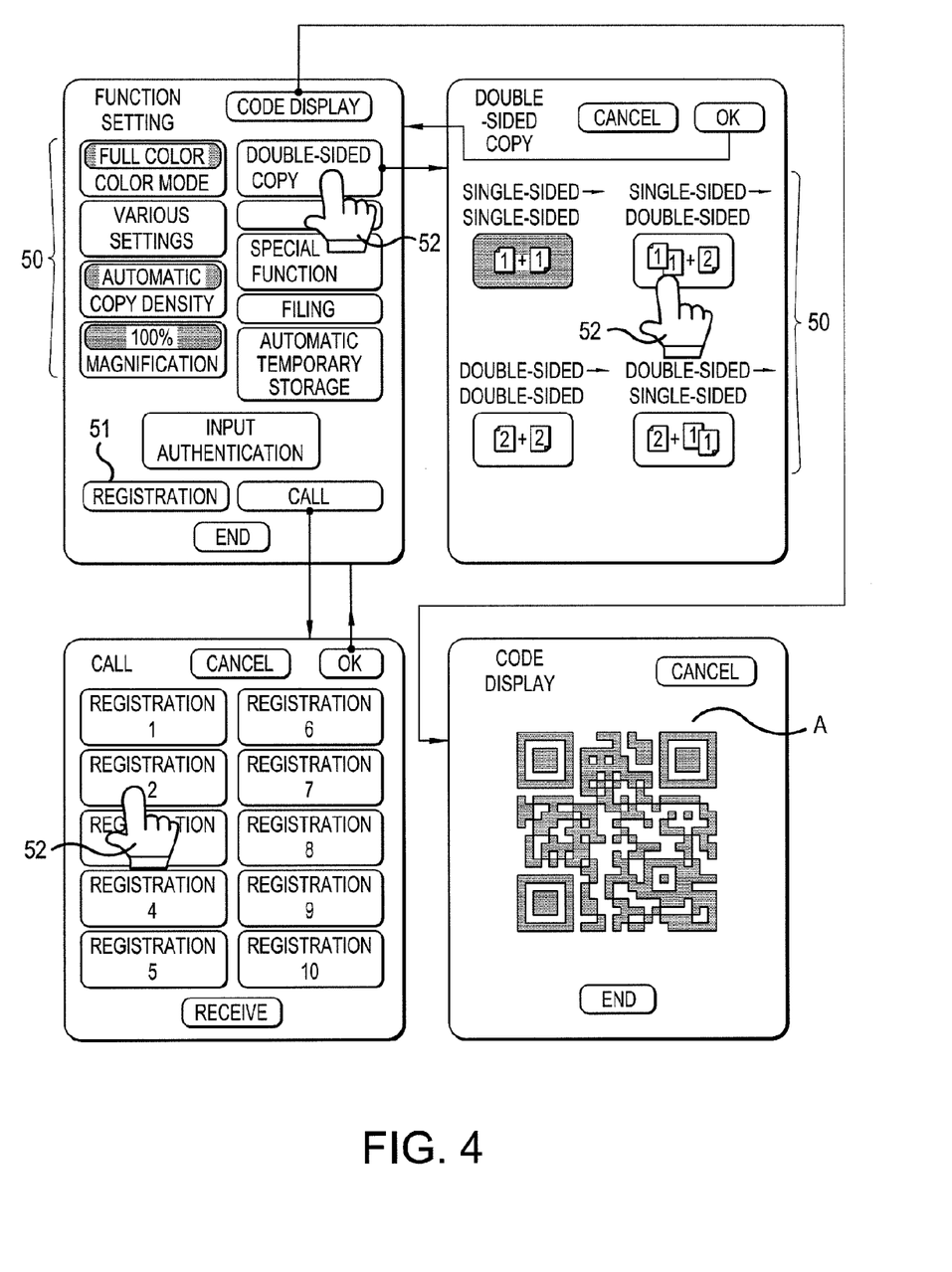
FIG. 4 is a diagram showing input screens of the mobile phone.

Next, description will be made on a procedure for a user to set a function with the use of the mobile phone 41 when executing a job on the image processing apparatus. Here, copying is to be performed as the job. As shown in FIG. 3, user operates the mobile phone 41 to activate the function setting information input program (S1-1). The control section of the mobile phone 41 causes the display section 42 to display an input screen as shown in FIG. 4.

On the input screen, multiple setting items 50 and multiple input buttons 51 are displayed. Then, a pointer 52 is displayed on the input screen. By the user operating the operation button on the operation section 43, the pointer 52 moves. When the user selects any setting item 50 or input button 51 with the pointer 52 and determines the selection, the control section registers the inputted setting item 50 as function setting information (S1-2).

For example, if the user selects "double-sided copying", the input screen is switched. If the user selects "single-sided-->double-sided" and selects an "OK button", then the setting item 50 is determined, and the screen in switched to the original input screen. In the case of continuing setting, another setting item 50 is selected to similarly provide input.

When the user finishes input and selects a "register button", the inputted setting item 50 is registered as the function setting information. The function setting information is stored in the storage section.

By repeating the input described above, the user can register multiple pieces of function setting information. By selectin a "call button" on the input screen, a list of registered function setting information is displayed. By selecting any registration number from this list, function setting information is called-up, and the information is displayed. The called-up function setting information can be edited. Therefore, in the case of setting a similar function, the function can be efficiently set without the necessity of inputting function setting information from the beginning.

When the user operates a "display code button" after inputting function setting information or calling registered function setting information, the control section performs a code conversion for the function setting information and creates a code image. Then, as shown in FIG. 4, the display section 42 displays a code image A (S1-3).

The user sets a document to copy it with the image processing apparatus (S1-4). The user inputs authentication information such as an ID and a password from the operation section 2. The apparatus control section 9 checks the inputted authentication information against registered authentication information to authenticate the user (S1-5). An IC chip mounted on the mobile phone 41 may be used for authentication of the user. The authentication information is registered with the IC chip in advance. The image processing apparatus communicates with the IC chip to input the authentication information.

Figure 5:
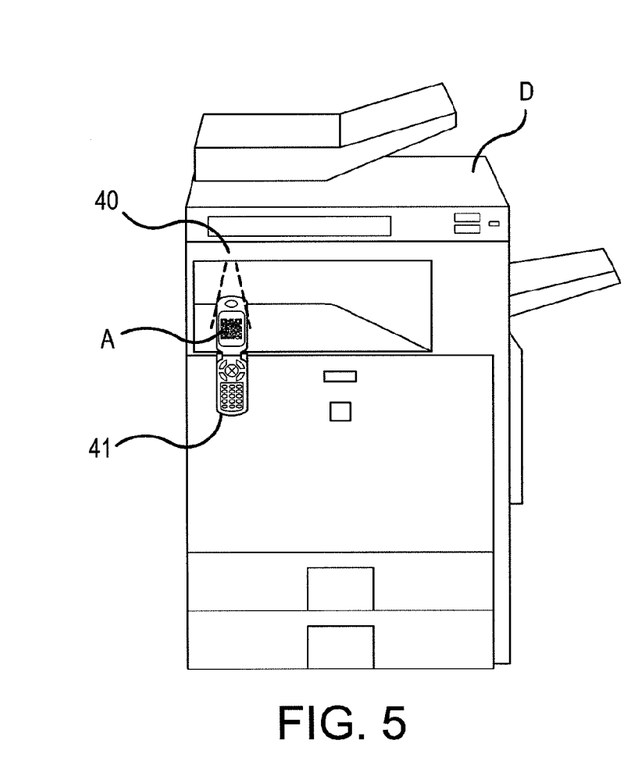
FIG. 5 is a diagram showing that the setting screen of the mobile phone is read by the image processing apparatus.

After the authentication, the user can use the image processing apparatus, and he holds up the code image displayed on the mobile phone 41 to the reading section 40 as shown in FIG. 5. The apparatus control section 9 decodes the code image to acquire various information at the time the reading section 40 reads the code image, and extracts the function setting information (S1-6). Then, the apparatus control section 9 sets a function according to the function setting information (S1-7). By the user operating a start button on the operation section 2, copying is executed in accordance with the set function (S1-8).

Thus, by operating the mobile phone 41 to input function setting information in advance, the user can immediately perform desired image processing on the image processing apparatus. Therefore, it is possible to reduce the time for which the user occupies the image processing apparatus, and the use efficiency of the image processing apparatus is improved. Furthermore, since the user can acquire the code image indicative of function setting information even if he is out of the service range of the mobile phone 41, he can use the image processing system for setting a function irrespective of the place of use.

The setting image may include not only the function setting information but also the authentication information. That is, the control section of the mobile phone 41 creates a code image on the basis of the authentication information such as an ID and a password.

Figure 6:
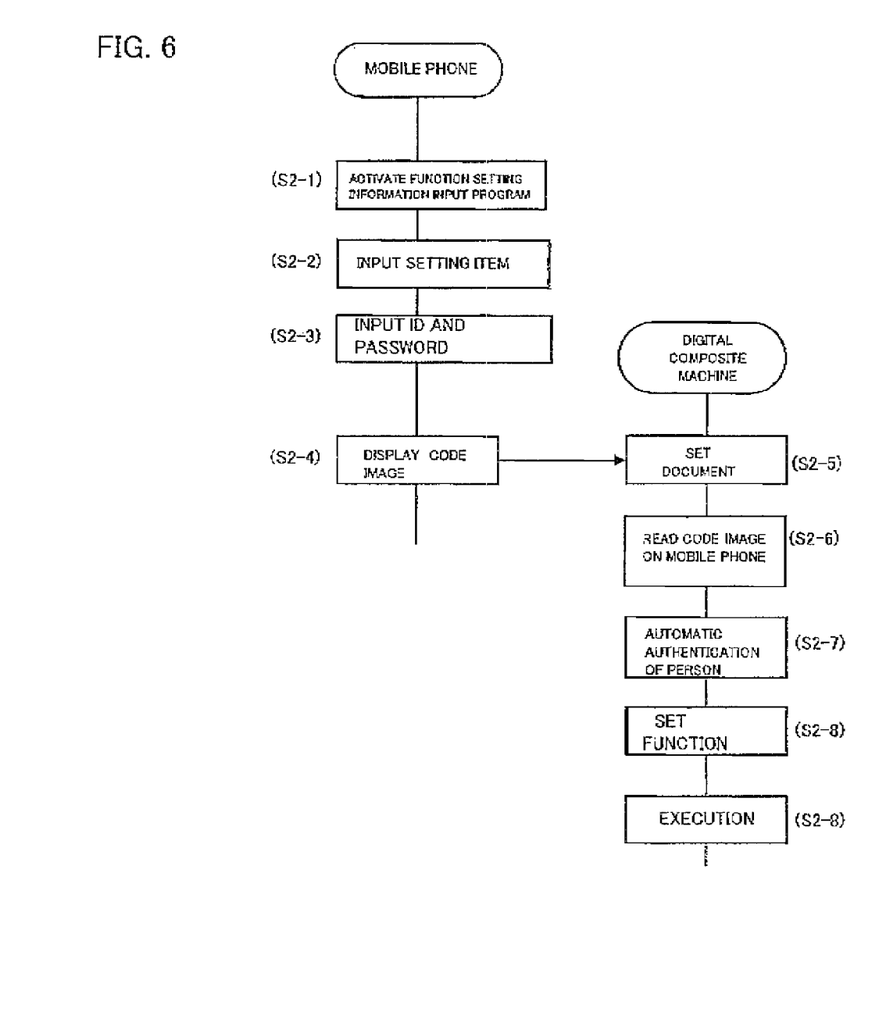
FIG. 6 is a flowchart for setting a function with the use of the mobile phone.

As shown in FIG. 6, the user inputs the authentication information after inputting the function setting information (S2-3). The control section creates a code image on the basis of the function setting information and the authentication information. In the image processing apparatus, the apparatus control section 9 first extracts the authentication information and automatically authenticates the user (S2-7) at the time the reading section 40 reads the code image. The other procedures are the same as the case shown in FIG. 3.

The user can eliminate the trouble of inputting the authentication information to the image processing apparatus and save the time for inputting the authentication information to the image processing apparatus, and the time of use by the user can be shortened.

Furthermore, the setting image may include instruction information for causing execution of image processing to be started. That is, when reading the code image from the mobile phone 41, the image processing apparatus automatically sets a function and starts image processing.

Figure 7:
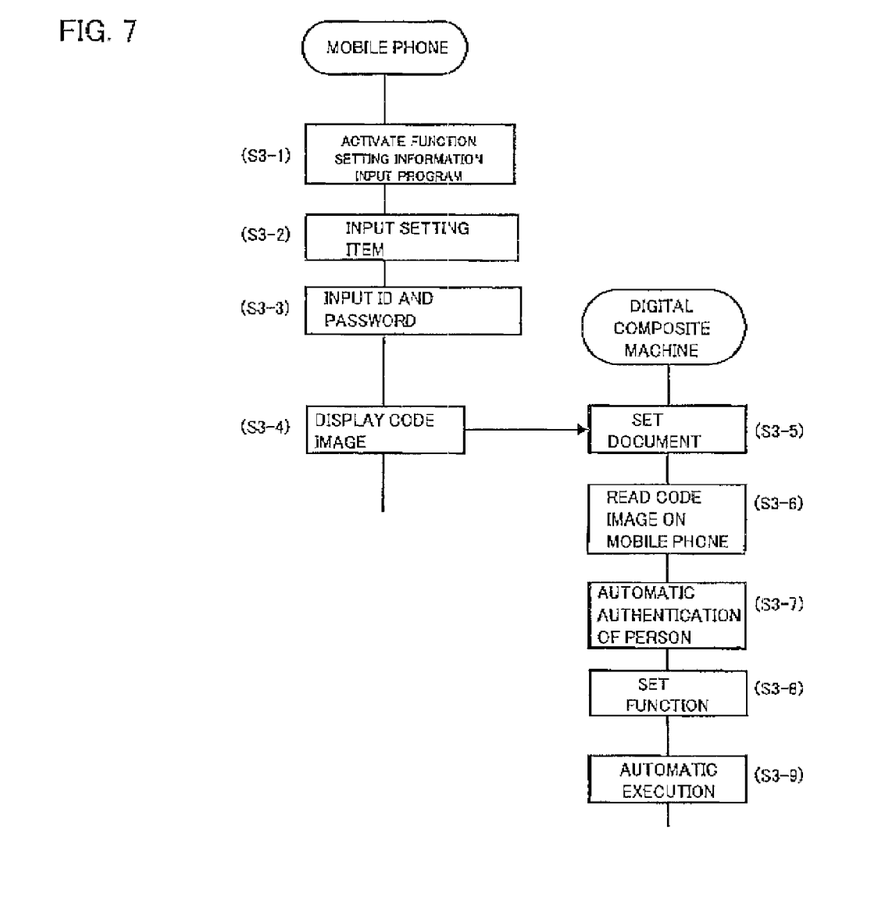
FIG. 7 is a flowchart for setting a function with the use of the mobile phone.

As shown in FIG. 7, after inputting the function setting information, the user inputs the authentication information (S3-3). The control section creates a code image on the basis of the function setting information, the authentication information and the instruction information. In the image processing apparatus, the apparatus control section 9 first extracts the authentication information and automatically authenticates the user (S3-7) at the time the reading section 40 reads the code image. After the authentication, the apparatus control section 9 extracts the function setting information and the instruction information. Then, it sets a function according to the function setting information (S3-8) and automatically executes image processing such as copying in accordance with the set function (S3-9). The other procedures are the same as the case shown in FIG. 3.

Thus, the user does not have to operate the start button, and the convenience for the user is improved.

Figure 8:
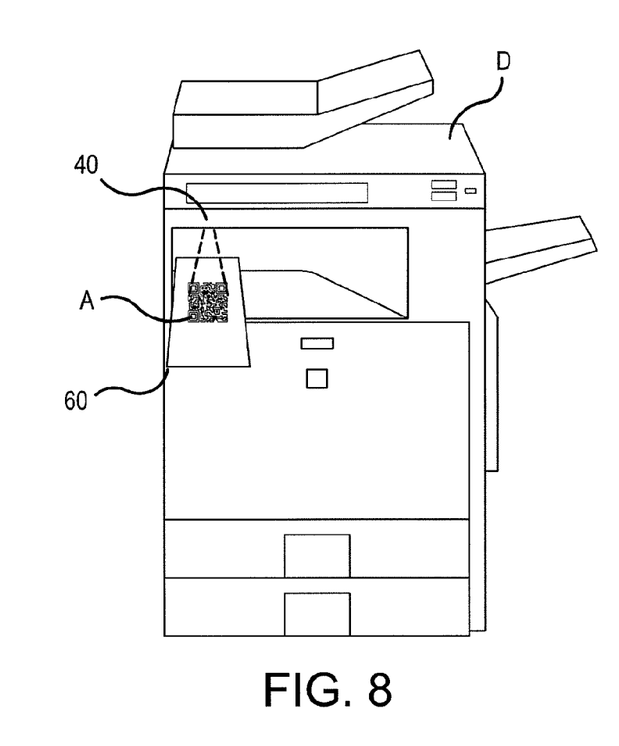
FIG. 8 is a flowchart for setting a function with the use of a recording sheet.

As shown in FIG. 8, a recording sheet 60 on which a setting image is formed to be displayed is used as the display medium. On the recording sheet 60, a code image indicative of function setting information is printed as the setting image. The reading section 40 of the image processing apparatus reads the code image on the recording sheet 60.

Figure 9:
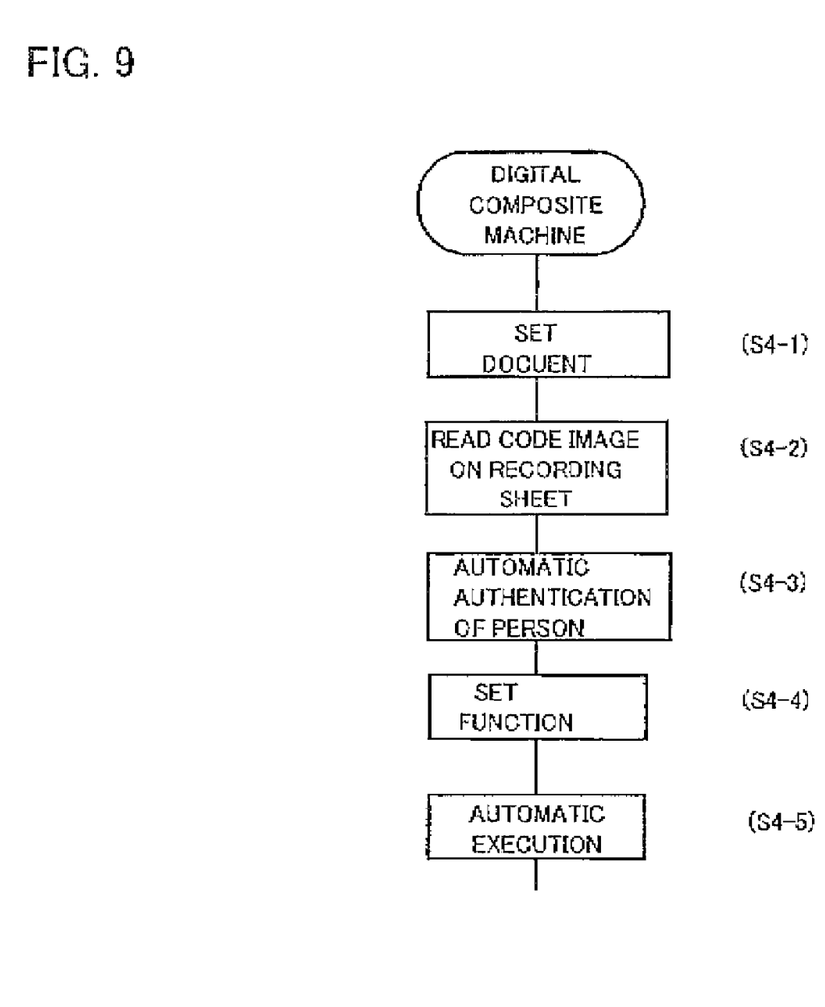
FIG. 9 is a diagram showing that the setting screen of the recording sheet is read by the image processing apparatus.

As shown in FIG. 9, the user sets a document on the image processing apparatus (S4-1) and holds up the recording sheet to the reading section 40 of the image processing apparatus. The reading section 40 reads the code image (S4-2). The subsequent steps are the same as the case shown in FIG. 7.

This recording sheet 60 may be read by the image reading section 1. That is, the recording sheet 60 on which the code image is printed is set at the top of the documents and read by the image reading section 1. When recognizing that the image on the first document is a code image, the apparatus control section 9 decodes the code image, extracts the function setting information and sets a function without performing the normal processing. In this case, the necessity of providing a dedicated reading section is eliminated.

In order to prepare the recording sheet 60 on which a code image is printed, the user transmits the code image created by the mobile phone 41 to the image processing apparatus. The communication section 44 or 45 of the mobile phone 41 may be used for the transmission, or the original data communication function of the mobile phone 41 may be used. The image processing apparatus prints the received code image on the recording sheet 60. Otherwise, an information processing apparatus such as a personal computer may be used. The function setting information input program provided on an information processing apparatus enables the apparatus to create a code image similarly to the mobile phone 41 described above. The information processing apparatus outputs the created code image to the image processing apparatus, and the image processing apparatus prints it on the recording sheet 60.

Here, the function setting information input program provided on the information processing apparatus enables the input of the function setting information. Therefore, the mobile phone 41 can provide input of the function setting information from an external apparatus.

That is, the user inputs the function setting information on the information processing apparatus. The information processing apparatus transmits the inputted function setting information to the mobile phone 41. The communication section 44 or 45 of the mobile phone 41 receives the function setting information from the information processing apparatus, and the control section stores the function setting information, and it creates a code image and causes the display section 42 to display it. An image processing apparatus may be used instead of an information processing apparatus. The image processing apparatus transmits the inputted function setting information to the mobile phone 41. The external apparatus, such as an information processing apparatus and an image processing apparatus, may create a code image and transmit it to the mobile phone 41 instead of transmitting the function setting information.

The present invention is not limited to the embodiment described above. It goes without saying that a lot of modifications and changes can be made in the embodiment described above within the scope of the present invention. A mobile information medium such as a PDA may be used as the display medium. It is recommended to display an input screen similar to the operation screen of the image processing apparatus. This input screen is the same screen as or a simplified screen of the operation screen. Thereby, the user can perform an operation with the same feeling as the feeling of operating the image processing apparatus, which improves the input efficiency for setting. Since the function setting information is displayed on this input screen, the input screen may be immediately used as the setting image.

When the model or the manufacturer of the image processing apparatus differs, how to set a function also differs. Therefore, the input screen for setting a function is adapted to be selected for each manufacturer and for each model. On a selected input screen, the function setting information is inputted to create a setting image such as a code image. Thereby, it is possible to set a function for various kinds of image processing apparatus by using one display medium.

Though, in the above embodiment, description has been made on the assumption of setting the double-sided copying function at the time of performing copying, the function setting is not limited thereto. A digital composite machine has various functions such as copying, printing, scanning, facsimile communication and document filing, and various settings can be made. For example, it has functions shown below, and these functions can be set. Furthermore, multiple functions can be set together.

The functions of copying include: color mode setting, the number of copies setting, copy density setting, copy image quality setting, document size setting, magnification setting, double-sided reading setting, double-sided output setting, sorting/grouping/stapling/punching setting, paper selection setting, binding margin setting, frame deletion setting, 1 set 2 copy setting, saddle-stitching setting, tandem copying setting, cover/interleaving paper setting, 2in1/4in1 setting, book copying setting, tab copying setting, filing setting, automatic copying execution setting; and the like.

The functions of scanning include: color mode setting, document density setting, document image quality setting, document size setting, magnification setting, double-sided reading setting, frame deletion setting, page division setting, destination specification, address setting, filing setting, automatic scanning execution setting, and the like.

The functions of printing include: file selection, PIN code input, the number of copies setting, sorting/grouping/stapling/punching setting, paper selection setting, automatic printing execution setting, and the like.

The functions of facsimile communication include: document density setting, document image quality setting, document size setting, magnification setting, double-sided reading setting, time specification, frame deletion setting, page division setting, 2in1 setting, destination specification, destination number setting, filing setting, automatic FAX execution setting, and the like.

The functions of document filing include: user name setting, file name setting, storage destination specification, color mode setting, document density setting, document image quality setting, document size setting, magnification setting, double-sided reading setting, frame deletion setting, page division setting, automatic filing execution setting, the number of copies setting, sorting/grouping/stapling/punching setting, paper selection setting, automatic printing execution setting, and the like.

Other functions include setting of management items, such as user registration, FAX address registration and e-nail address registration.

What is claimed is:

1. An image processing system comprising:
   an image processing apparatus which performs image processing on the basis of a function set according to function setting information; and
   a portable display medium having a display section for displaying a setting image to provide the image processing apparatus with function setting information,
   wherein the image processing apparatus is provided with a reading section for reading an image displayed on the display section of the portable display medium, and an image scanning section for reading an image of a document set,
   the portable display medium includes an information input section for inputting function setting information and a control section for creating a setting image on the basis of the input function setting information, and wherein
   the control section stores multiple pieces of function setting information and displays a setting image corresponding to called-up function setting information,
   the portable display medium incorporates a function setting information input program, and when the function setting information for the image processing of a document set on the image reading section is inputted through the information input section, the control section stores the inputted function setting information and has the display section display a setting image created on the basis of the function setting information, and
   the image processing apparatus, when, after a document is set on the image reading section of the image processing apparatus, the reading section reads a setting image displayed on the portable display medium, sets a function on the basis of the function setting information obtained from the setting image and performs image processing for the document read by the image reading section.

2. The image processing system according to claim 1, wherein the portable display medium is a mobile terminal apparatus having a screen.

3. The image processing system according to claim 2, wherein the setting image includes authentication information about a user, and the image processing apparatus performs authentication of the user on the basis of the setting image.

4. The image processing system according to claim 2, wherein the setting image includes instruction information for starting execution of image processing, and, the image processing apparatus automatically starts setting of a function at the time the setting image is read.

5. The image processing system according to claim 2, wherein the setting image is a code image.

6. The image processing system according to claim 1, wherein when the function setting information input program starts, the information input section communicates with an external apparatus and inputs the function setting information from the external apparatus.

7. The image processing system according to claim 1, wherein
   when the function setting information input program starts, the information input section displays a screen identical with an operation screen of the image processing apparatus.

8. The image processing system according to claim 1, wherein
   when a setting image is printed on a recording sheet and the setting image on the recording sheet is read by the reading sections.

9. The image processing system according to claim 1, wherein
   a setting image is printed on a recording sheet, the recording sheet is set at a top of the documents, and the setting image on the recording sheet is read by the image reading sections.

* * * * *